United States Patent [19]

Ryan

[11] 4,141,124
[45] Feb. 27, 1979

[54] METHOD AND APPARATUS FOR REMOVING ONE OR MORE VANES FROM A GAS TURBINE COMPRESSOR STATOR

[75] Inventor: Edward J. Ryan, Wallingford, Conn.

[73] Assignee: United Technologies Corporation, Hartford, Conn.

[21] Appl. No.: 828,370

[22] Filed: Aug. 29, 1977

[51] Int. Cl.$^2$ .......................... B23P 19/04; B23P 7/00
[52] U.S. Cl. ................................. 29/427; 29/156.4 R; 29/252; 83/188
[58] Field of Search ................ 29/427, 401 R, 401 F, 29/156.4 R, 156.8 R, 426, 156.8 B, 156.8 H, 254, 255, 54; 83/188

[56] References Cited

U.S. PATENT DOCUMENTS

| | | | |
|---|---|---|---|
| 3,698,273 | 10/1972 | Richard et al. | 83/188 |
| 3,802,046 | 4/1974 | Wachtell et al. | 29/156.8 R |
| 3,909,157 | 9/1975 | Wachtell et al. | 29/156.8 R |

Primary Examiner—Milton S. Mehr
Attorney, Agent, or Firm—Edward J. Timmer

[57] ABSTRACT

Disclosed is an improved method and apparatus for removing damaged or worn vanes which are brazed or otherwise metallurgically attached between the concentric inner and outer shroud members of a gas turbine compressor stator. The method involves punching one of the attached vane ends in the radial direction relative to the concentric shroud members with sufficient force to shear the metallurgical joints holding the vane in the shroud slots. During punching, the shroud members are rigidly supported against deformation in the vicinity of the attached vane ends and the vane itself is supported laterally to prevent buckling thereof. With the invention, a stator can be repaired with no diminution in structural strength as compared to a new part. A punch and die assembly for use in removing a damaged vane is also disclosed.

17 Claims, 2 Drawing Figures

METHOD AND APPARATUS FOR REMOVING ONE OR MORE VANES FROM A GAS TURBINE COMPRESSOR STATOR

BACKGROUND OF THE INVENTION

1. Field of the Invention

The present invention relates to the repair of gas turbine engines and, more particularly, to methods and apparatus for removing damaged or worn vanes from a compressor stator during engine overhaul.

2. Description of the Prior Art

Generally, the compressor stator of a gas turbine engine includes concentric inner and outer cylindrical shroud members having a plurality of airfoil shaped vanes fixtured therebetween such that the longitudinal axis of each vane is radially aligned relative to the shroud members. In certain engines, the vanes are fixtured by brazing or otherwise metallurgically attaching the opposite ends of each vane in suitably shaped slots through the inner and outer shroud members. In the past, expensive noble metal alloys, such as 82% Au-18% Ni and 54% Ag-25% Pd-21% Cu, have been primarily utilized as braze alloys. Nickel base braze alloys, although much less expensive, have found only limited use.

Vane replacement is a common overhaul repair for gas turbine engine compressor stators. Damaged vanes are removed either singly or as a set and new vanes rebrazed in their place so that the compressor stator can be returned to service. Methods now available for removal of damaged vanes include oxyacetylene torching, electrical discharge machining, chemical dissolution and mechanical grinding. In oxyacetylene torching, the damaged vane is heated until the braze alloy softens sufficiently to allow the vane to be physically extracted with pliers. This removal technique is disadvantageous in that, due to the high localized temperature required to soften the braze alloy, the slots through the shroud members become oxidized and deformed and must be remachined. Also, due to the heat, the shroud alloy exhibits evidence of over-tempering with local variations in ductility and hardness. As a result, compressor stators repaired by this technique normally experience a reduction in structural strength. The electrical discharge machining technique utilizes an airfoil shaped electrode to remove the attachment areas. This technique is expensive in that 20 to 30 minutes are required to remove each vane and it is relatively imprecise in that machining often does not follow the exact outline of the shroud slot, resulting in oversized slots which are very difficult to rebraze, which exhibit reduced joint strength and which can cause changes in vane angle. Further, the machining process creates a recast alloy layer in the shroud slot which, if not properly treated, will lead to shroud cracking. In chemical removal techniques, localized areas of the shroud are submerged in a tank of suitable acid or the like to dissolve the braze alloy from the slot and vane. Of course, this process is disadvantageous since other areas of the stator must be masked to prevent contact with the acid. For certain braze alloys, very long times of submersion are required to effect removal of the braze material. Finally, mechanical grinding involves manually grinding the vane flush with both the inner and outer shrouds and then grinding out the vane remnants from the shroud slots. This vane removal process is not only time consuming, but also includes a high probability for damaging the shroud slots and surrounding shroud areas. A primary reason why nickel base braze alloys have found only limited use for vane attachment in compressor stators is the unsatisfactoriness of the above-described techniques in removing such a brazing material during engine overhaul operations.

SUMMARY OF THE INVENTION

The present invention provides improved means for removing one or more vanes from a compressor stator of a gas turbine engine.

The invention is advantageous in engine overhaul operations in that vane removal is effected in very short times, removal time typically being less than 1 minute for each vane.

The invention is also advantageous in that shroud slot dimensions remain substantially within original blueprint tolerances after vane removal, providing structural or joint strength after rebrazing equivalent to a new part.

The invention is also advantageous in that some of the original braze material remains in the shroud slots after vane removal and can be reused in attaching a new vane, reuse of the braze material resulting in considerable cost savings, especially when noble metal braze alloys are utilized.

The invention is further advantageous in that it is effective in removing vanes brazed to the shrouds with nickel base braze alloys as well as noble metal braze alloys.

In a typical embodiment of the invention, a damaged or defective vane is removed by punching one of the attached ends of the vane in the radial direction relative to the concentric shroud members with sufficient force to shear the brazed or other metallurgical joints by which the vane is attached in the inner and outer shroud slots. During punching, the inner and outer shroud members are supported against deformation in the vicinity of the vane ends and the vane itself is laterally supported to prevent buckling. After the brazed joints are sheared, the vane can be readily freed for replacement.

In another embodiment of the invention, vane removal is effected in two steps, the first of which involves removing a portion of the vane between the inner and outer shroud members, leaving an inner vane stub joined at one end to the inner shroud and an outer vane stub joined at one end to the outer shroud. The second step provides for punching the attached end of each vane stub to shear the braze alloy or other material holding the stubs in the shroud slots while rigidly supporting the shroud members in the vicinity of the vane stub ends to prevent distortion during punching.

A preferred apparatus for use in the present invention includes a punch and die assembly. In a preferred assembly for punching the vane end which is attached to the inner shroud member in the radially outward direction to shear both the inner and outer vane joints simultaneously, the die includes a base on which the outer shroud member is positioned and supported near the outer end of the vane to be removed and first and second die members adapted to fit between the inner and outer shroud members on opposite sides of the vane, the top surfaces of the die members contacting the inner shroud member. The die members are further characterized by opposed inner mating surfaces which are contoured to define the approximate outer shape of the vane when the members are assembled in working relationship on the opposite sides of the vane. Suitable support and clamping means are provided to maintain the die members in working relationship during punching so that the members not only radially support the inner shroud member against deformation but also laterally support the vane itself to prevent buckling thereof. The punch includes a punch member supported above the inner shroud member and movable relative thereto so that it can be brought to bear on the vane end to be punched. Preferably, the punch member is supported by a suitable structure affixed to the die base. For achievement of optimum contact, the punch member preferably has a cross-section resembling that of the vane end to be punched, that is, an approximate airfoil cross-section. Movement of the punch member against the vane end is effected by conventional means such as hydraulic or pneumatic presses or the like.

These and other features, advantages and objects of the invention will become more fully apparent from the following drawings and detailed description of the preferred embodiments.

DESCRIPTION OF THE PREFERRED EMBODIMENTS

Figure 1:
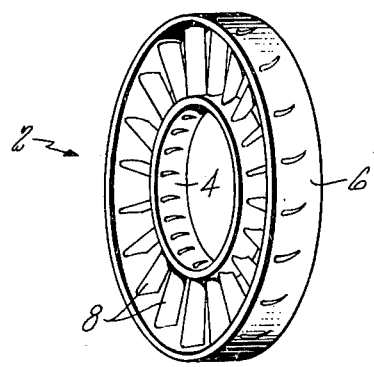
FIG. 1 is a perspective view of a typical compressor stator of a gas turbine engine.

Referring to FIG. 1, a typical compressor stator 2 is shown. Generally, the stator includes concentric inner and outer cylindrical shroud members 4 and 6 having a plurality of airfoil-shaped vanes 8 fixtured therebetween. As shown, the vanes are fixtured in such a manner that the longitudinal axis of each vane is aligned radially in relation to the concentric shroud members 4 and 6. Proper fixturing of the vanes is achieved by providing suitably-shaped slots through the inner and outer shroud members to receive the opposite ends of each vane and by brazing or otherwise metallurgically attaching the ends in the slots. This type of compressor stator construction is known in the art. A typical modern gas turbine engine may include ten or more such compressor stators in the compressor section of the engine.

It is common practice in the aircraft industry to overhaul gas turbine engines after specified periods of operation. Included in the overhaul is the replacement of damaged or worn vanes in the compressor stators. The present invention is directed to improved means for removing one or more such vanes from a stator in the course of routine engine overhaul operations.

Figure 2:
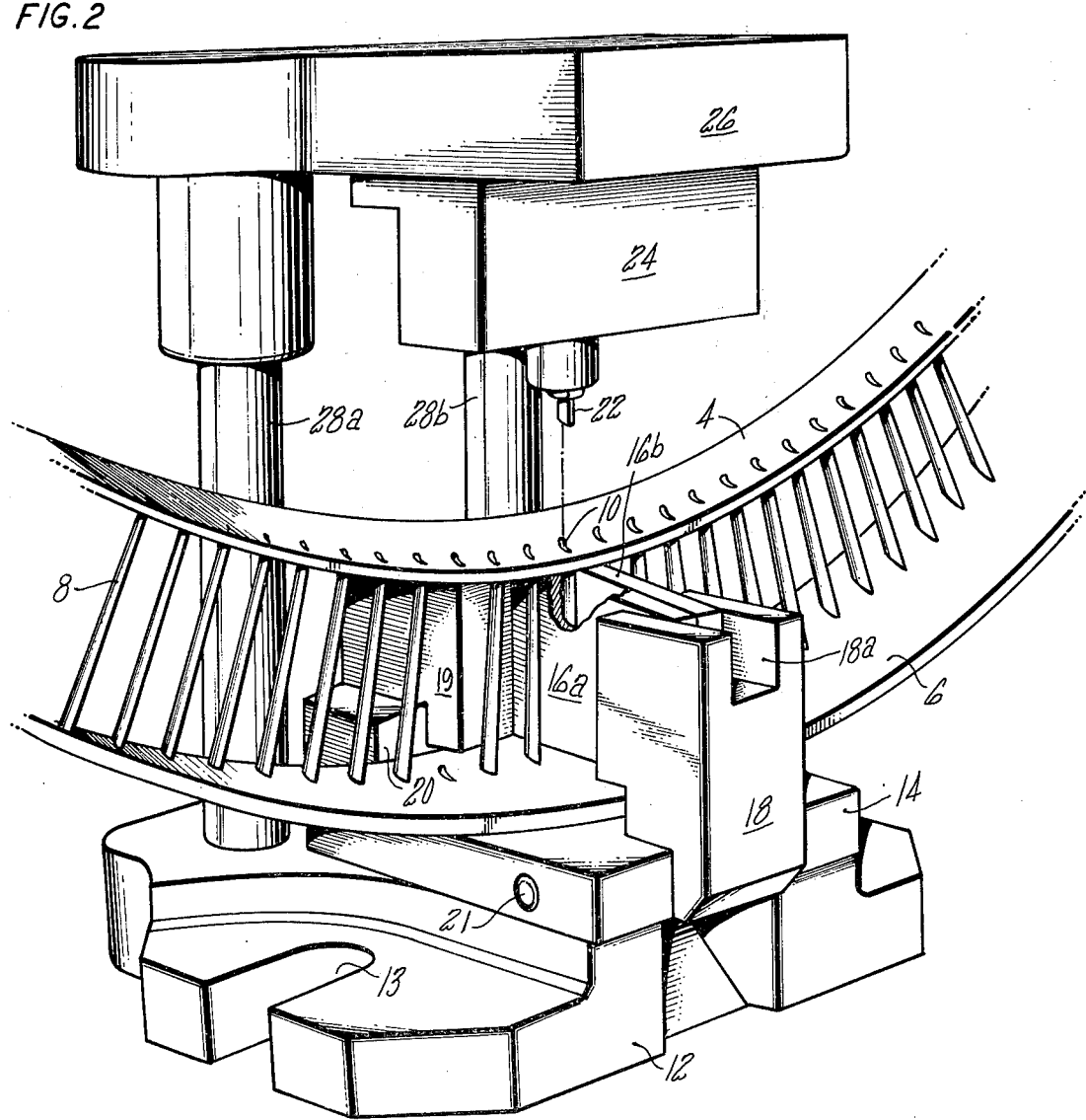
FIG. 2 is a perspective view showing a punch and die assembly for removing a damaged vane by punching the vane end which is attached to the inner shroud.

In a preferred method of the invention, a damaged or worn vane is removed by punching one of the attached vane ends in the radial direction relative to the shroud members, that is, in the direction of the vane longitudinal axis, with sufficient force to shear the brazed or other metallurgical joints holding the vane in the inner and outer shroud slots. However, in order to achieve successful removal, the inner and outer shroud members must be rigidly supported against radial distortion in the vicinity of the vane ends and the vane itself must be laterally supported to prevent buckling during punching. A punch and die assembly capable of satisfying these requirements is shown in FIG. 2, the assembly being positioned to punch the inner vane end 10 brazed in a slot in inner shroud member 4.

The die portion of the assembly includes a base 12 having suitable slots 13 for securing the base to the bed of a suitable press. Affixed to the die base is outer shroud support plate 14 on which the outer shroud member is positioned and supported in the vicinity of the outer end of the vane to be removed. The support plate 14 includes a cavity (not shown) beneath the outer end of the vane to provide clearance space for projection of the end after punching. Positioned between the inner and outer shroud members are first and second die members 16a and 16b which are in the form of vertically oriented die plates placed on opposite sides of the vane. As shown, the die plates are machined so that the inner opposed mating surfaces are contoured to define a cavity in the approximate outer shape of the vane when the plates are placed in working relationship on opposite sides of the vane. The die plates are positioned and held in such relationship by clamping and support member 18 on one side of the stator and another member 19, which may be of similar or different configuration, on the opposite side of the stator. Members 18 and 19 also position and support the top surfaces of the die members in contact with the lower circumferential surface of the inner shroud member. In such an arrangement, the die plates not only radially support the inner shroud member against distortion but also laterally support the vane to be removed to prevent its buckling during punching. The die plates are thus an important feature of the inventive apparatus, for, without them, the vane could buckle during punching and prevent shearing of the brazed joints. Preferably, one of the die plates is pinned or otherwise secured against movement in the slot 18a of member 18, whereas the other plate is movable for facilitating set up of the assembly. It is also preferable to facilitate set up that member 18 be movable relative to shroud support 14, such as by being rotatably mounted on pin 21. In addition to the functions already discussed, member 18 along with locator 20, which is attached to support plate 14, also serve to precisely position the outer shroud member 6. Those skilled in the art will recognize that clamping and support member 18 and its companion member 19 may take various other forms, as desired, and, in some cases, may be mounted independently from die base 12 and support plate 14. Likewise, the die members 16a and 16b may take other forms and configurations.

The punch portion of the assembly is shown supported above the die and inner shroud and includes punch member 22 mounted on punch support plate 24. Plate 24 is in turn mounted to platform 26. Platform 26 is movable vertically on spaced legs 28a and 28b so that the punch member can be brought to bear on end 10 of the vane. Conventional hydraulic or pneumatic presses or like devices can be used to force platform 26 downwardly toward the inner shroud to effect punching action. In order to insure optimum force transmittal to the end 10 of the vane, it is preferred that the punch member cross-section resemble that of the vane end, that is, that the punch have an approximate airfoil cross-section.

In operation, after the compressor stator is fixtured and supported as shown, the press forces the platform 26 downwardly to engage the punch member with the end 10 of the vane. Sufficient force is applied to punch member 22 in the radially outward direction to shear the upper joint at end 10 and also the lower joint at the outer shroud member, freeing the vane for removal. The punching action may be a slow, steady force or an impact force, as desired. Of course, the type and amount of punching force will depend upon the braze or weld material used, the shape of the vane and other factors.

The invention is advantageous for several reasons. First, the time for removal of a vane is very short as compared to prior art techniques, removal times generally being less than 1 minute per vane. Second, as a result of shearing the braze or other material holding the vane ends, the slot dimensions are not adversely affected and remain substantially within original tolerances. Third, some braze material remains in the slots after vane removal and is, therefore, available for reuse in attaching a replacement vane. With noble metal braze alloys, this advantage provides considerable cost benefits. And, the invention is as equally effective in shearing nickel base braze alloys as noble metal braze alloys. This feature should enable increased use of the much less expensive and stronger nickel base braze alloys for vane attachment in compressor stators. Prior to the present invention, use of nickel base brazes was limited due to the inability of prior art techniques to disassembly such joints.

Another embodiment of the invention involves a two-step procedure for removing a damaged or worn vane. The first step involves removing a portion of the vane between shroud members 4 and 6, such as by torch cutting, sawing and the like. Typically, the vane is cut about one-half inch from the shroud members, leaving an inner vane stub one end of which is attached to the inner shroud member and an outer vane stub one end of which is attached to the outer shroud member, the inner stub projecting radially outward and the outer stub projecting radially inward. Thereafter, the vane stubs are freed by punching the attached ends to shear the brazed joints holding the stubs in the respective shroud slots. The stubs may be punched simultaneously or one at a time, as desired. However, it is important that the respective shroud members be rigidly supported in the vicinity of each attached end to prevent radial distortion during punching. Since the central portion of the vane has been previously removed, there is no need to provide lateral vane support. In this embodiment, a punch and die assembly similar to that shown in FIG. 2 can be used or other simpler assemblies may be provided.

Although the preferred apparatus of FIG. 2 is constructed to punch the end of the vane attached to the inner shroud member, it will be understood by those skilled in the art that the apparatus may be modified, such as by altering the contour of base 12 so that the inner shroud member can be supported and positioned thereon, to punch the vane end attached to the outer shroud member. In that case, the punching action will be in the radially inward direction relative to the shroud members. Those skilled in the art will also appreciate that other changes, omissions and additions in the form and detail of the illustrated embodiments may be made without departing from the spirit and the scope of the invention.

Having just described preferred embodiments of our invention, that which we claim as new and desire to secure by Letters Patent of the United States is:

1. A method for removing a vane from a gas turbine compressor stator wherein the stator includes a plurality of vanes fixtured between concentric inner and outer cylindrical shroud members, the opposite ends of each vane being metallurgically attached in slots through the shroud members such that the longitudinal axis of each vane is radially aligned relative to the shroud members, comprising:
   punching one of the attached ends of the vane in the radial direction relative to the concentric shroud members with sufficient force to shear the metallurgical joints holding the vane in the inner and outer shroud slots while, during punching, said shroud members are supported against radial deformation in the vicinity of said vane ends and the vane is laterally supported to prevent buckling thereof, shearing of the metallurgical joints freeing the vane for removal.

2. The method of claim 1 wherein at least one end of the vane is brazed in a shroud slot and, after shearing of the brazed joint, a portion of the braze material remains in the slot for reuse in attaching a new vane.

3. The method of claim 2 wherein the brazed joint comprises a noble metal braze alloy.

4. The method of claim 1 wherein the end of the vane attached in the slot in the inner shroud member is punched in the radially outward direction relative to the shroud members to shear the metallurgical joints.

5. The method of claim 1 wherein the end of the vane attached in the slot in the outer shroud member is punched in the radially inward direction relative to the shroud members to shear the metallurgical joints.

6. A method for removing a vane from a gas turbine compressor stator wherein the stator includes a plurality of vanes fixtured between concentric inner and outer cylindrical shroud members, the opposite ends of each vane being metallurgically attached in slots through the shroud members such that the longitudinal axis of each vane is radially aligned relative to the shroud members, comprising:
   (a) removing a portion of the vane between the shroud members, leaving an inner vane stub one end of which is attached in the slot in the inner shroud member and an outer vane stub one end of which is attached in the slot in the outer shroud member; and
   (b) punching the attached end of the inner vane stub and outer vane stub in the radial direction relative to the concentric shroud members with sufficient force to shear the metallurgical joints holding the vane stubs in the respective inner and outer shroud slots while, during punching, said shroud members are supported against radial deformation in the vicinity of the respective vane stubs, shearing of the metallurgical joints freeing the vane stubs for removal.

7. The method of claim 6 wherein at least one end of the vane is brazed in a shroud slot and, after shearing of the brazed joint, a portion of the braze material remains in the slot for reuse in attaching a new vane.

8. An apparatus useful for removing a vane from a gas turbine compressor stator wherein the stator includes a plurality of vanes fixtured between concentric inner and outer cylindrical shroud members, the opposite ends of each vane being metallurgically attached in slots through the shroud members such that the longitudinal axis of each vane is radially aligned relative to the shroud members, comprising:
   (a) a base on which one of the shroud members is positioned and supported in the vicinity of the lower end of the vane to be removed;

(b) first and second die members disposed between the inner and outer shroud members on opposite sides of the vane to be removed, the top surfaces of the die members being in contact with the other shroud member in the vicinity of the upper end of the vane, the die members having inner mating surfaces contoured to define a cavity in the approximate shape of the vane when the members are assembled on opposite sides of the vane in working relationship;

(c) means for clamping and supporting the die members between the shroud members in working relationship on opposite sides of the vane; and (d) a punch member supported above the upper end of the vane to be removed in radial alignment therewith, the punch member being movably mounted so that it can be brought to bear on the upper end of the vane and apply sufficient force in the radial direction relative to the shroud members to shear the metallurgical joints holding the vane in the shroud slots;

whereby said die members and base support the shroud members against radial distortion during punching and said die members further provide lateral support to said vane to prevent buckling thereof during punching.

9. The apparatus of claim 8 wherein the die base is disposed against the outer shroud member to position and support said member in the vicinity of the lower end of the vane to be removed and the top surfaces of the die members are in contact with the inner shroud member in the vicinity of the upper end of the vane.

10. The apparatus of claim 8 wherein the die members are upwardly oriented plate members.

11. The apparatus of claim 10 wherein the clamping and supporting means comprises first and second members affixed to the die base adjacent to said stator on opposite sides thereof, at least one of said members having a slot therein to receive, support and clamp the die plates together in working relationship on opposite sides of the vane.

12. The apparatus of claim 8 wherein the punch member has an approximate airfoil cross-section resembling that of the vane end to be punched to optimize contact therebetween.

13. The apparatus of claim 8 which also includes means for moving the punch member into end-to-end contact with the vane end and applying force in the radial direction thereto.

14. The apparatus of claim 8 which also includes spaced leg members attached to the base and extending upwardly to movably support the punch member above the upper end of the vane.

15. An apparatus useful for removing a vane from a gas turbine compressor stator wherein the stator includes a plurality of vanes fixtured between concentric inner and outer cylindrical shroud members, the opposite ends of each vane being metallurgically attached in slots through the shroud members such that the longitudinal axis of each vane is radially aligned relative to the shroud members, comprising:

(a) a base on which one of the shroud members is positioned and supported in the vicinity of the attached end of the vane to be removed;

(b) first and second die members disposed between the inner and outer shroud members on opposite sides of the vane to be removed, the die members being in contact with the other shroud member in the vicinity of the other attached end of the vane, the die members having inner mating surfaces contoured to define a cavity in the approximate shape of the vane when the members are assembled on opposite sides of the vane in working relationship;

(c) means for clamping and supporting the die members between the shroud members in working relationship on opposite sides of the vane; and (d) a punch member supported in radial alignment with said other attached end of the vane, the punch member being movably mounted so that it can be brought to bear on said other end of the vane and apply sufficient force in the radial direction relative to the shroud members to shear the metallurgical joints holding the vane in the shroud slots;

whereby said die members and base support the shroud members against radial distortion during punching and said die members further provide lateral support to said vane to prevent buckling thereof during punching.

16. The apparatus of claim 15 wherein the die base is disposed against the outer shroud member to position and support said member in the vicinity of the lower attached end of the vane to be removed and the die members are in contact with the inner shroud member in the vicinity of the upper attached end of the vane.

17. The apparatus of claim 16 wherein the die members are upwardly oriented plate members, the top surfaces of which are in contact with the inner shroud member in the vicinity of the upper attached end of the vane to provide radial support thereto.

* * * * *